(12) United States Patent
Negandhi et al.

(10) Patent No.: US 7,855,001 B2
(45) Date of Patent: Dec. 21, 2010

(54) THERMOPLASTIC POLYMER FOR ELECTRICALLY CONDUCTIVE THERMOFORMING APPLICATIONS

(75) Inventors: Nishant Negandhi, Medina, OH (US); Hrishikesh Manian, Medina, OH (US)

(73) Assignee: Ovation Polymer Technology and Engineered Materials, Inc., Cleveland, OH (US)

( * ) Notice: Subject to any disclaimer, the term of this patent is extended or adjusted under 35 U.S.C. 154(b) by 365 days.

(21) Appl. No.: 12/180,805

(22) Filed: Jul. 28, 2008

(65) Prior Publication Data

US 2010/0021765 A1 Jan. 28, 2010

(51) Int. Cl.
*C08G 63/183* (2006.01)
*C08L 51/00* (2006.01)
*C08L 51/04* (2006.01)
*C08L 51/06* (2006.01)
*G11B 5/127* (2006.01)
*C08K 3/04* (2006.01)
*B82B 1/00* (2006.01)

(52) U.S. Cl. ........................ 428/800; 524/496

(58) Field of Classification Search .......... 428/800; 524/496; 977/742; 525/64, 71, 74, 80, 85
See application file for complete search history.

(56) References Cited

U.S. PATENT DOCUMENTS 7,191,512 B2   3/2007   Girard et al. .................. 29/759
7,360,653 B2   4/2008   Blake et al. ................. 206/725
2006/0148984 A1 *  7/2006   Persigehl et al. .............. 525/67
2008/0161468 A1 *  7/2008   Juikar et al. ................ 524/423

* cited by examiner

*Primary Examiner*—Jeffrey C Mullis
(74) *Attorney, Agent, or Firm*—Alvin T. Rockhill

(57) ABSTRACT

This invention relates to a thermoplastic polymer composition that exhibits excellent characteristics for being thermoformed into a wide variety of packaging trays for electronics, including the disk drive and semiconductor industries. More specifically, these trays are applicable as packaging material for head suspension assembly and offer conductivities in the range of antistatic to electrostatic dissipation (ESD). For instance, the thermoplastic polymer composition of this invention offers improved stiffness, improved chemical resistance, the capable of enduring more washing cycles, the capability of being dried at higher temperatures, improved cleanliness, and better electrical conductivity that conventional PETG/IDP polymer blends. The thermoplastic polymer composition of this invention is comprised of (1) a polyethylene terephthalate glycol copolyester, (2) from 1 weight percent to 6 weight percent carbon nanotubes, (3) from 2 weight percent to 30 weight percent of a copolymer of ethylene with a higher α-olefin, wherein the copolymer is of ethylene with the higher α-olefin is grafted with maleic anhydride or glycidyl methacrylate, (4) from 1 weight percent to 10 weight percent of a functionalized rubbery polymer, (5) from 1 weight percent to 10 weight percent of an acrylic based core-shell polymer, and (6) from 0.5 weight percent to 6 weight percent of a lubricant selected from the group consisting of high density polyethylene and polyester wax, where the polyethylene terephthalate glycol copolyester makes up the balance of the composition and wherein all weight percentages are based upon the total weight of the thermoplastic polymer composition.

20 Claims, No Drawings

THERMOPLASTIC POLYMER FOR ELECTRICALLY CONDUCTIVE THERMOFORMING APPLICATIONS

FIELD OF THE INVENTION

This invention relates to a thermoplastic polymer which can be thermoformed into electrically conductive packaging for the electronics industry. This thermoplastic polymer can be beneficially utilized in manufacturing trays for supporting disk drive head suspension assemblies during storage, transportation, cleaning and manufacturing procedures.

BACKGROUND OF THE INVENTION

In many industries, component parts used in the assembly of a larger item of equipment are often shipped to an assembler in either disposable or recyclable packages. Typically, the manufacturer removes the component from the shipping package, and places the component into a processing fixture. The processing fixture holds the component sufficiently rigid such that certain processes can be performed on the component. Removal of a component from its shipping tray and placement into the processing fixture can be done either by automation or manually.

While the foregoing describes a common method of assembling component parts into a larger whole, it also describes a process infused with complexity and cost. If the components are removed with automation, the capital cost of such equipment and related overhead adds cost to the manufacturer. If the components are removed manually, the labor rate of the operators performing this act also increases the manufacturer's cost. Further, in many cases, the processing fixtures employed by manufacturers are complex and costly. Finally, where the components are fragile or otherwise easily damaged, the removal of the component from its shipping package and its installation into a processing fixture, whether by hand or through some automated procedure, may result in costly component damage from the handling of the component As an illustration of the foregoing methods and processes and the problems associated therewith, the hard disk drive industry can be considered. A hard disk drive is the device most predominantly used for long term memory/data storage in modern computer systems. In overview, a hard disk drive comprises a disk that is rotated at high speeds. The disk has a magnetic coating or read/write media that can be selectively magnetized with the application of a magnetic field thereto. A "read/write" device, commonly called a head, is attached to and held closely adjacent the disk by a head suspension assembly and is moved radially relative to the rotating disk, that is, from the edge of the disk toward the center and back. Electric current is provided to the head which creates and applies a magnetic field to the disk as the head moves relative thereto. Selective areas of the disk are preferentially magnetized as the magnetic field is applied to the disk. Each magnetized area consists of a north and south pole selectively oriented in one of two preferred directions. Magnetized areas having a north pole pointing in one of the two direction are designated as a "0" and in the other direction as a "1" In this way the binary language of computers consisting of zeroes and ones is assembled on the magnetized disk coating and data and programs, which comprise zeroes and ones in binary computer language, are stored on the hard disk.

Continuing with the example of the disk drive industry, head suspension assemblies are shipped in disposable vacuum-formed trays to manufacturers who may attach the read/write head thereto. The manufacturers remove the head suspension assembly from its shipping tray and place it into an intricate processing fixture, referred to as a "head bond fixture." Typically, head bond fixtures are precise, machined metal fixtures with several moving parts. Often times, these fixtures include a small clamping mechanism to hold the suspension assembly sufficiently rigid during the assembly process. The surface of the fixture which mates with the suspension assembly is ground to complex geometries with very tight tolerances, thus making them very costly. Once placed within the head bond fixture, the suspension assembly is held in such a manner that a read/write head can be bonded to it.

As in any industry, manufacturing costs in the hard disk drive industry are carefully monitored. The hard disk provides large amounts of storage capability at relatively low cost. As the technology continually matures, the storage density per unit of cost, that is, the quantity of data stored per dollar, is continuously increasing, as is the reliability of the hard disk and its related components, (collectively called the hard disk drive, hard drive, or disk drive) and the rate at which data can be transferred to and from the disk. That is, advancing hard disk technology is resulting in the storage of increasing amounts of information at decreasing unit costs. Yet, in spite of the rapid advance in storage technology, the technology continues to face cost pressures as competition in the marketplace intensifies and computer programs grow in size. It would be helpful if the cost pressures arising out of damage that occurs during the assembly process could be reduced as well as the cost pressures that result from labor or inflexible tooling intensive processes.

Head suspension assemblies are extremely fragile and susceptible to damage from handling such as that occurring during the assembly process. That is, the act of removing a head suspension assembly from its packaging and installing it in a processing fixture can result in the destruction of the assembly or damage it so as to degrade seriously the suspension's later operational performance.

One source of possible damage to the components stems from electrostatic discharge (ESD) or electrical overstress (EOS), collectively referred to as ESD/EOS. ESD/EOS usually results from touching an object and causing a build-up of static charges. Prior to the time that the head suspension assembly is installed into a disk drive, the electrical interconnect is electrically connected to the read and write elements, but is not connected to the drive electronics. As a result, the individual conductors that make up the electrical interconnect, can easily be charged by stray voltages, thereby creating a voltage potential across the sensitive magnetoresistive or giant magnetoresistive read elements of the read/write head, which when discharged results in damaging current transients through the read element.

The components used in hard disk drives are small and continually decreasing in size. Consequently, any tolerance for ESD/EOS damage of the components during the assembly process is also continuously decreasing while their susceptibility to damage during assembly is increasing. The present methods of assembly, however, are the source for the creation of much static potential charge, whether through direct handling of the component parts or because of the human assemblers doing some normal activity such as shuffling their feet or wiping their brow. Minimizing the handling of the head suspension assembly is thus desirable, yet present packaging, transportation and assembly methods result in the need for an undesirable amount of such handling.

The small size of the components and their continually decreasing size also reduces any tolerance for misalignment of the components during the assembly process while increasing their susceptibility to damage during assembly. Current disk drive assembly includes expensive, labor intensive processes, particularly the assembly of the flex circuit to the suspension assembly. The labor intensive nature of the assembly process has several consequences. First, the labor increases the final cost of the assembled suspension. Second, because of the heavy use of labor in the assembly, there is a meaningful quantity of handling of the components by the assembler, which increases the likelihood of damage to the components. Third, the assemblers are limited in both the precision and speed with which the flex circuits can be assembled to the suspensions. Fourth, even though human assemblers are used, the assembly process is quite tooling intensive. Fifth, as the part geometries change as the technology advances, the costs also increase because of the need for new tooling in the assembly of the new parts; that is, the tooling used is either not adaptable or not readily adaptable to new part geometries.

Additional costs that are not included in calculation of the cost of the use of human assemblers are those of the consumer whose hard drive fails, perhaps due to damage to a component by a human assembler. Though data backups are always advised, such advice is often unheeded. When a hard drive fails the consumer may lose valuable data that is either not easily replaced or is replaced only at some cost in terms of time and effort, if not actual cash outlays.

Many of the foregoing deficiencies in the employment of human assemblers could be reduced or eliminated with a precision automated assembly apparatus and method for attaching flex circuits to suspensions. Automated assembly machines and methods should result in lower costs, reduced component handling and possible damage, and have greater flexibility to accommodate variations in component types, geometries and improved placement tolerances. Simple automation of the actual assembly of the flex circuit to the suspension will not, however, eliminate the problems associated with removing the components from their shipping trays and placing them in an assembly apparatus.

For the reasons delineated above, there was a need for an inexpensive packaging tray that can also be utilized as a processing fixture. This approach has several advantages over the processes and apparatus described above. First, because the components need not be removed from the shipping tray during subsequent manufacturing processes, the likelihood of damage resulting from handling is significantly reduced. Second, the costs associated with the removal of the component from the shipping package are eliminated. Finally, this approach eliminates the need for costly processing fixtures. Disk drive head suspension assembly trays that can be used in storage, transportation, cleaning and manufacturing procedures are described in U.S. Pat. No. 7,191,512.

U.S. Pat. No. 7,191,512 more specifically describes a tray system for holding and positioning head suspensions as components, the tray system comprising: a first tray comprising a first side having at least one component receptacle and an opposite second side having at least one component receptacle, wherein at least one of the component receptacles of the first side of the first tray comprises a base plate seat positioned adjacent a first load beam seat, and at least one of the component receptacles of the second side of the first tray comprises a base plate collar seat adjacent a second load beam seat; and a second tray engageable with the first tray, the second tray comprising a first side having at least one component receptacle and an opposite second side having at least one component receptacle, wherein at least one of the component receptacles of the first side of the second tray comprises a base plate seat positioned adjacent a first load beam seat, and at least one of the component receptacles of the second side of the second tray comprises a base plate collar seat adjacent a second load beam seat, wherein the second side of the first tray is adjacent the first side of the second tray so that the at least one component receptacle of the first side of the second tray is substantially aligned with the at least one component receptacle of the second side of the first tray for cooperatively restraining the motion of at least one component, of the components, positioned therein.

U.S. Pat. No. 7,360,653 describes a tray for supporting a plurality of disk drive suspension assemblies that either have a first configuration or a second configuration that is generally a mirror image of the first configuration, each disk drive suspension assembly having a load beam with a proximal mounting region having an aperture and a tail member extending proximally from the mounting region, the tray comprising: a frame; a first member extending across the frame and having a plurality of first support features, each first support feature, adapted to support the mounting region of a suspension assembly of the first configuration and of the second configuration; and a second member extending across the frame and having a plurality of tail support features, each adapted to support a portion of a tail member proximal to the mounting region and constrain lateral movement of the supported portion of the tail member, wherein each tail support feature is positioned relative to a respective first support feature so as to support and laterally contain the portion of the tail member of a disk drive suspension assembly of the first configuration or the portion of the tail member of a disk drive suspension assembly of the second configuration.

U.S. Pat. No. 7,360,653 also describes a tray for supporting a plurality of disk drive suspension assemblies each having a flexible load beam with a proximal mounting region, wherein the load beam in a neutral position extends from the proximal mounting region and wherein deflection of the load beam from the neutral position beyond a plastic deformation position causes plastic deformation of the load beam, the tray comprising: a frame; a first member extending across the frame and adapted to support the proximal mounting regions of the plurality of suspension assemblies; and a second member extending across the frame, the second member being spaced apart from the load beams in their neutral position and for contacting the load beams before the load beams are in their plastic deformation position.

The disk drive head suspension assembly trays of the prior art have typically been made by injection molding, vacuum forming, or thermoforming a blend of polyethylene terephthalate glycol (PETG) with an inherently dissipative polymer (IDP) based on a polyamide or a copolyester-amide. However, polymer blends of this type are far from optimal as a material for use in automated manufacturing of disk drive head suspension assembly trays. For instance, it would be desirable for the thermoplastic polymer used in making such head suspension assembly trays to offer improved stiffness, good dimensional tolerances, improved chemical resistance, to be capable of enduring more washing cycles, to be capable of being dried at higher temperatures, to display improved cleanliness, and to exhibit higher electrical conductivity.

SUMMARY OF THE INVENTION

This invention relates to a thermoplastic polymer composition that exhibits excellent characteristics for being thermoformed into disk drive head suspension assembly trays. More specifically, these trays are applicable as packaging material for head suspension assembly and offer conductivities in the range of antistatic to electrostatic dissipation (ESD). For instance, the thermoplastic polymer composition of this invention offers improved stiffness, good dimensional tolerances, improved chemical resistance, the capability of enduring more washing cycles, the capability of being dried at higher temperatures, improved cleanliness, and better electrical conductivity that conventional PETG/IDP polymer blends. Additionally, the thermoplastic polymer compositions of this invention are inherently black in color which is critical for laser-driven automated processes.

The thermoplastic polymer composition of this invention is comprised of (1) a polyethylene terephthalate glycol copolyester, (2) from 1 weight percent to 6 weight percent carbon nanotubes, (3) from 2 weight percent to 30 weight percent of a copolymer of ethylene with a higher α-olefin, wherein the copolymer is of ethylene with the higher α-olefin is grafted with maleic anhydride or glycidyl methacrylate, (4) from 1 weight percent to 10 weight percent of a functionalized rubbery polymer, (5) from 1 weight percent to 10 weight percent of an acrylic based core-shell polymer, and (6) from 0.5 weight percent to 6 weight percent of a lubricant selected from the group consisting of high density polyethylene and polyester wax, where the polyethylene terephthalate glycol copolyester makes up the balance of the composition and wherein all weight percentages are based upon the total weight of the thermoplastic polymer composition.

The present invention also relates to a disk drive head suspension assembly tray which is comprised of an exterior frame having substantially perpendicularly adjacent sides, frame sides having essentially planar top and bottom surfaces, at least two feet, at least two foot seats, at least one support rib, and a repository that is adapted to seat and retain a disk drive head suspension, wherein the disk drive head suspension assembly tray is comprised of (1) a polyethylene terephthalate glycol copolyester, (2) from 1 weight percent to 6 weight percent carbon nanotubes, (3) from 2 weight percent to 30 weight percent of a copolymer of ethylene with a higher α-olefin, wherein the copolymer is of ethylene with the higher α-olefin is grafted with maleic anhydride or glycidyl methacrylate, (4) from 1 weight percent to 10 weight percent of a functionalized rubbery polymer, (5) from 1 weight percent to 10 weight percent of an acrylic based core-shell polymer, and (6) from 0.5 weight percent to 6 weight percent of a lubricant selected from the group consisting of high density polyethylene and polyester wax, where the polyethylene terephthalate glycol copolyester makes up the balance of the composition and wherein all weight percentages are based upon the total weight of the thermoplastic polymer composition.

The subject invention also specifically reveals a tray system for holding and positioning head suspensions as components, the tray system comprising: a first tray comprising a first side having at least one component receptacle and an opposite second side having at least one component receptacle, wherein at least one of the component receptacles of the first side of the first tray comprises a base plate seat positioned adjacent a first load beam seat, and at least one of the component receptacles of the second side of the first tray comprises a base plate collar seat adjacent a second load beam seat; and a second tray engageable with the first tray, the second tray comprising a first side having at least one component receptacle and an opposite second side having at least one component receptacle, wherein at least one of the component receptacles of the first side of the second tray comprises a base plate seat positioned adjacent a first load beam seat, and at least one of the component receptacles of the second side of the second tray comprises a base plate collar seat adjacent a second load beam seat, wherein the second side of the first tray is adjacent the first side of the second tray so that the at least one component receptacle of the first side of the second tray is substantially aligned with the at least one component receptacle of the second side of the first tray for cooperatively restraining the motion of at least one component, of the components, positioned therein; wherein the first tray and/or the second tray are comprised of (1) a polyethylene terephthalate glycol copolyester, (2) from 1 weight percent to 6 weight percent carbon nanotubes, (3) from 2 weight percent to 30 weight percent of a copolymer of ethylene with a higher α-olefin, wherein the copolymer is of ethylene with the higher α-olefin is grafted with maleic anhydride or glycidyl methacrylate, (4) from 1 weight percent to 10 weight percent of a functionalized rubbery polymer, (5) from 1 weight percent to 10 weight percent of an acrylic based core-shell polymer, and (6) from 0.5 weight percent to 6 weight percent of a lubricant selected from the group consisting of high density polyethylene and polyester wax, where the polyethylene terephthalate glycol copolyester makes up the balance of the composition and wherein all weight percentages are based upon the total weight of the thermoplastic polymer composition.

The present invention also reveals a tray for supporting a plurality of disk drive suspension assemblies each having a flexible load beam with a proximal mounting region, wherein the load beam in a neutral position extends from the proximal mounting region and wherein deflection of the load beam from the neutral position beyond a plastic deformation position causes plastic deformation of the load beam, the tray comprising: a frame; a first member extending across the frame and adapted to support the proximal mounting regions of the plurality of suspension assemblies; and a second member extending across the frame, the second member being spaced apart from the load beams in their neutral position and for contacting the load beams before the load beams are in their plastic deformation position; wherein the tray is comprised of (1) a polyethylene terephthalate glycol copolyester, (2) from 1 weight percent to 6 weight percent carbon nanotubes, (3) from 2 weight percent to 30 weight percent of a copolymer of ethylene with a higher α-olefin, wherein the copolymer is of ethylene with the higher α-olefin is grafted with maleic anhydride or glycidyl methacrylate, (4) from 1 weight percent to 10 weight percent of a functionalized rubbery polymer, (5) from 1 weight percent to 10 weight percent of an acrylic based core-shell polymer, and (6) from 0.5 weight percent to 6 weight percent of a lubricant selected from the group consisting of high density polyethylene and polyester wax, where the polyethylene terephthalate glycol copolyester makes up the balance of the composition and wherein all weight percentages are based upon the total weight of the thermoplastic polymer composition.

The subject invention further reveals a tray for supporting a plurality of disk drive suspension assemblies each having a flexible load beam with a proximal mounting region, wherein the load beam in a neutral position extends from the proximal mounting region and wherein deflection of the load beam from the neutral position beyond a plastic deformation position causes plastic deformation of the load beam, the tray comprising: a frame; a first member extending across the frame and adapted to support the proximal mounting regions of the plurality of suspension assemblies; and a second member extending across the frame, the second member being spaced apart from the load beams in their neutral position and for contacting the load beams before the load beams are in their plastic deformation position; wherein the tray is comprised of (1) a polyethylene terephthalate glycol copolyester, (2) from 1 weight percent to 6 weight percent carbon nanotubes, (3) from 2 weight percent to 30 weight percent of a copolymer of ethylene with a higher α-olefin, wherein the copolymer is of ethylene with the higher α-olefin is grafted with maleic anhydride or glycidyl methacrylate, (4) from 1 weight percent to 10 weight percent of a functionalized rubbery polymer, (5) from 1 weight percent to 10 weight percent of an acrylic based core-shell polymer, and (6) from 0.5 weight percent to 6 weight percent of a lubricant selected from the group consisting of high density polyethylene and polyester wax, where the polyethylene terephthalate glycol copolyester makes up the balance of the composition and wherein all weight percentages are based upon the total weight of the thermoplastic polymer composition.

The present invention also discloses a process for making a thermoplastic polymer composition which comprises (1) mixing a polyethylene terephthalate glycol copolymer and carbon nanotubes in a first mixing step to produce a PETG/carbon nanotube premix, and (2) mixing additional polyethylene terephthalate glycol copolymer, a copolymer of ethylene with a higher α-olefin, wherein the copolymer is of ethylene with the higher α-olefin is grafted with maleic anhydride or glycidyl methacrylate, a functionalized rubbery polymer, an acrylic based core-shell polymer, and a lubricant selected from the group consisting of high density polyethylene and polyester wax throughout the PRTG/carbon nanotube premix made in step (1), wherein from 25 weight percent to 70 weight percent of the total constituents of the thermoplastic polymer composition are added in step (1) to make the premix.

DETAILED DESCRIPTION OF THE INVENTION

The polyethylene terephthalate glycol copolymer (PETG) used in the thermoplastic polymer compositions of this invention has repeat units that are derived from terephthalic acid, ethylene glycol, and an additional glycol selected from the group consisting of 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, and 1,3-cyclohexanedimethanol. Ethylene glycol will typically constitute from about 60% to 90% of the glycol component used in synthesizing the PETG and the additional glycol will accordingly make up the remaining 10% to 40% of the glycol component. Ethylene glycol will more typically constitute from about 70% to 80% of the glycol component used in synthesizing the PETG and the additional glycol will accordingly make up the remaining 20% to 30% of the glycol component. It is typically preferred to utilize 1,4-cyclohexanedimethanol as the additional glycol. Such a PETG would accordingly be comprised of polymer chains that are derived from terephthalic acid, ethylene glycol, and 1,4-cyclohexanedimethanol.

The PETG used in the practice of this invention can also be made by polymerizing a second dicarboxylic acid in addition to terephthalic acid therein. Such amorphous PETG will accordingly have repeat units that are derived from terephthalic acid, ethylene glycol, and the additional dicarboxylic acid. The repeat units that are derived from the additional dicarboxylic acid will act to inhibit crystallization in such polymers. The additional dicarboxylic acids that can be used for this purpose will typically contain from 8 to 16 carbon atoms. Some representative examples of aromatic dicarboxylic acids that can be used include isophthalic acid, orthophthalic acid, 1,8-naphthalenedicarboxylic acid, 1,7-naphthalenedicarboxylic acid, 1,6-naphthalenedicarboxylic acid, 1,5-naphthalenedicarboxylic acid, 2,6-naphthalenedicarboxylic acid, 2,7-naphthalenedicarboxylic acid, 1,7-anthracenedicarboxylic acid, 2,6-anthracenedicarboxylic acid, 2,7-anthracenedicarboxylic acid, 2,6-phenalenedicarboxylic acid, 1,6-phenalenedicarboxylic acid, 1,7-phenalenedicarboxylic acid, 2,8-naphthacenedicarboxylic acid, 2,9-naphthacenedicarboxylic acid, 1,7-naphthacenedicarboxylic acid, 1,10-naphthacenedicarboxylic acid, 2,7-pyrenedicarboxylic acid, 2,6-pyrenedicarboxylic acid, and 2,8-pyrenedicarboxylic acid. Isophthalic acid and 2,6-naphthalenedicarboxylic acid are preferred dicarboxylic acids for utilization in the acid component of such amorphous PETG polyesters in conjunction with the terephthalic acid. It should also be understood that the PETG can be modified with both a glycol in addition to ethylene glycol and with a diacid in addition to terephthalic acid.

The PETG used in the practice of this invention is thermoformable and typically has a melt viscosity which is within the range of 0.8 to 10 grams per 10 minutes. The PETG used in the practice of this invention preferably has a melt viscosity which is within the range of 0.9 to 5 grams per 10 minutes, and most preferably has a melt viscosity which is within the range of 1 to 3 grams per 10 minutes.

The carbon nanotubes used in making the thermoplastic polymer compositions of this invention normally have a diameter which is within the range of 5 to 20 nanometers and have a length which is within the range of 1 to 5 microns. The carbon nanotubes used in making the thermoplastic polymer compositions of this invention more typically have a diameter which is within the range of 7 to 15 nanometers and have a length which is within the range of 1 to 3 microns. The carbon nanotubes used in making the thermoplastic polymer compositions of this invention preferably have a diameter which is within the range of 8 to 13 nanometers and have a length which is within the range of 1 to 2 microns. Such carbon nanotubes typically have an aspect ratio which is within the range of 80 to 180 and more typically have an aspect ratio which is within the range of 90 to 150. The carbon nanotubes used in making the thermoplastic polymer compositions of this invention preferably have an aspect ratio which is within the range of 95 to 120.

The copolymer of ethylene with a higher α-olefin used in making the thermoplastic polymer compositions of this invention has from about 0.5 weight percent to 2.5 weight percent of maleic anhydride or glycidyl methacrylate grafted onto it. It is typically preferred for the level of maleic anhydride or glycidyl methacrylate grafted onto the backbond of the polymer to be within the range of 0.9 weight percent to 1.5 weight percent. The higher α-olefin will typically contain from 2 to about 12 carbon atoms and will preferably contain form 6 to 10 carbon atoms. The α-olefin will preferably be 1-octene and it is normally preferred for the grafting agent to be maleic anhydride. Fusabond® MN-493D is a maleic anhydride grafted ethylene-octene copolymer having a melting point of 48° C. and a density of 0.87 which is commercially available from DuPont that can be used in the practice of this invention.

The functionalized rubbery polymer will generally be a compatibilizing ethylene copolymer of the formula E/X/Y, where E is about 55-75%, X is about 15-35%, and Y is about 2-15% by weight of the compatibilizing ethylene copolymer, and E is ethylene, X is an α,β-ethylenically unsaturated monomer derived from at least one of alkylacrylate, alkylmethacrylate, alkyl vinyl ether, carbon dioxide, sulfur dioxide, or mixtures thereof, where the alkyl groups contain 1-12 carbon atoms, such as vinyl acetate, methylacrylate, butylacrylate, and methyl vinyl ether. X can, for example, be a moiety derived from at least one of alkyl acrylate, alkyl methacrylate, alkyl vinyl ether, carbon monoxide, sulfur dioxide, or mixtures thereof. More specifically, X can, for example, consist of 0-35 weight percent of a moiety derived from at least one alkyl acrylate, alkyl methacrylate, or mixtures thereof where the alkyl groups contain 1-8 carbon atoms. Y is an α,β-ethylenically unsaturated monomer containing a reactive group, such as epoxide, maleic anhydride, isocyanate, or oxazoline, for example, that forms a covalent bond with said first polymeric component. In one preferred embodiment, Y is selected from the group consisting of glycidyl methacrylate and glycidyl acrylate, maleic anhydride, and isocyanato-ethylmethacrylate.

The functionalized rubbery polymer will typically contain repeat units that are derived from an acrylate monomer of the structural formula:

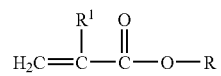

wherein R represents a hydrogen atom, an alkyl group containing from 1 to about 8 carbon atoms, or a moiety containing an epoxy group, and wherein $R^1$ represents a hydrogen atom or an alkyl group containing from 1 to about 8 carbon atoms. Some representative examples of monomers that can be used include methyl methacrylate, butyl acrylate, dimethylsiloxane. In many cases, R will represent an alkyl group containing from 1 to 4 carbon atoms. The moiety containing an epoxy group will typically be of the structural

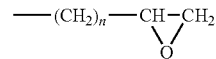

wherein n represents an integer from 1 to about 6. In most cases, n will represent 1.

The functionalized rubbery polymer will generally also contain repeat units that are derived from a conjugated diolefin monomer, such as 1,3-butadiene or isoprene, a vinyl aromatic monomer, such as styrene or α-methyl styrene, a monoolefin monomer, such as ethylene or propylene, and/or a dialkylsiloxane monomer, such as dimethylsiloxane.

The functionalized rubbery polymer can optionally contain repeat units in its backbone which are derived from an anhydride group containing monomer, such as maleic anhydride. In another scenario, the functionalized rubbery polymer can contain anhydride moieties which are grafted onto the polymer in a post polymerization step. Lotader® 8900 is a terpolymer of ethylene, methyl methacrylate and glycidyl methacrylate that can be used as the functionalized rubbery polymer in the practice of this invention.

The acrylic based core-shell polymer will typically have an acrylic core and a shell that is comprised of polymethylmethacrylate. Durastrength®440 is core-shell acrylic based impact modifier that can be used as the acrylic based core-shell polymer in the practice of this invention.

The lubricant used in making the thermoplastic polymer compositions of this invention is either high density polyethylene or a polyester wax, such as Glycolube wax. It is frequently preferred to use a combination of high density polyethylene and a polyester wax in making the thermoplastic polymer compositions of this invention. For example, from 0.5 weight percent to 6 weight percent of polyester wax can be used as a lubricant in conjunction with 0.5 weight percent to 3 weight percent of high density polyethylene which is used to improve surface finishing characteristics.

The thermoplastic polymer compositions of this invention are made by a two step process. In the first step a portion of the polyethylene terephthalate glycol copolymer is mixed with the carbon nanotubes and optionally additional components of the composition being made. The first mixing step results in the production of a PETG/carbon nanotube premix. Then in the second step additional polyethylene terephthalate glycol copolymer, the grafted copolymer of ethylene with a higher α-olefin, the functionalized rubbery polymer, the acrylic based core-shell polymer, and the lubricant selected from the group consisting of high density polyethylene and polyester wax are dispersed throughout the PETG/carbon nanotube premix made in step (1). In this mixing procedure from 25 weight percent to 70 weight percent of the total constituents of the thermoplastic polymer composition are added in step (1) to make the premix. It is typically preferred for from 30 weight percent to 55 weight percent of the total constituents of the thermoplastic polymer composition to be added in step (1) to make the premix.

This mixing will typically be done by melt blending the components of the thermoplastic polymer composition. This can be done in a suitable mixing device for melt blending, such as a single or twin screw extruder or multiple mixing devices with controlled specific energy input via control of feed rate (15 to 95% torque), RPM (60 to 900 rpm), process temperature and residence time distribution. The specific energy input will typically be within the range of 0.15 to 0.5 kilowatt hours per kilogram and will more typically be within the range of 0.2 to 0.4 kilowatt hours per kilogram.

The thermoplastic polymer compositions of this invention will typically contain (1) the polyethylene terephthalate glycol copolyester, (2) from 1 weight percent to 6 weight percent of the carbon nanotubes, (3) from 2 weight percent to 30 weight percent of the copolymer of ethylene with a higher α-olefin, wherein the copolymer is of ethylene with the higher α-olefin is grafted with maleic anhydride or glycidyl methacrylate, (4) from 1 weight percent to 10 weight percent of the functionalized rubbery polymer, (5) from 1 weight percent to 10 weight percent of the acrylic based core-shell polymer, and (6) from 0.5 weight percent to 6 weight percent of the lubricant selected from the group consisting of high density polyethylene and polyester wax. It should be noted that the polyethylene terephthalate glycol copolyester makes up the balance of the composition and that all weight percentages are based upon the total weight of the thermoplastic polymer composition. The thermoplactic polymer compositions of this invention will preferably contain (1) the polyethylene terephthalate glycol copolyester, (2) from 1.5 weight percent to 5 weight percent of the carbon nanotubes, (3) from 4 weight percent to 25 weight percent of the copolymer of ethylene with a higher α-olefin, wherein the copolymer is of ethylene with the higher α-olefin is grafted with maleic anhydride or glycidyl methacrylate, (4) from 2 weight percent to 8 weight percent of the functionalized rubbery polymer, (5) from 2 weight percent to 8 weight percent of the acrylic based core-shell polymer, and (6) from 0.8 weight percent to 4 weight percent of the lubricant selected from the group consisting of high density polyethylene and polyester wax. The thermoplactic polymer compositions of this invention will most preferably contain (1) the polyethylene terephthalate glycol copolyester, (2) from 2 weight percent to 4 weight percent of the carbon nanotubes, (3) from 6 weight percent to 15 weight percent of the copolymer of ethylene with a higher α-olefin, wherein the copolymer is of ethylene with the higher α-olefin is grafted with maleic anhydride or glycidyl methacrylate, (4)

from 3 weight percent to 6 weight percent of the functionalized rubbery polymer, (5) from 3 weight percent to 6 weight percent of the acrylic based core-shell polymer, and (6) from 1 weight percent to 3 weight percent of the lubricant selected from the group consisting of high density polyethylene and polyester wax. This thermoplastic polymer composition can optionally contain small amounts (level of less than about 1 weight percent) of thermal stabilizers, UV stabilizers, antioxidants, and/or flame retardants.

The thermoplastic polymer compositions of this invention can then be thermoformed into disk drive head suspension assembly trays of various desired designs. Disk drive head suspension assembly trays that can be made by thermoforming the thermoplastic polymer compositions of this invention are described in U.S. Pat. No. 7,191,512 and U.S. Pat. No. 7,360,653. The teachings of U.S. Pat. No. 7,191,512 and U.S. Pat. No. 7,360,653 are incorporated herein by reference for the purpose of illustrating disk drive head suspension assembly trays that can be beneficially made by thermoforming the thermoplastic polymer compositions of this invention.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

The main feeder of a ZE 25 twin screw extruder (L/D=44) operated at a rate of 350 rpm and a set temperature profile of 35° C. (feed), 230° C. (Zone 2), 255° C. (Zone 3), 260° C. (Zone 4), 260° C. (Zone 5), 260° C. (Zone 6), 260° C. (Zone 7), 255° C. (Zone 8), 255° C. (die), was charged with 77.8 parts of Skygreen PETG, 3.0 parts of Lotader 8900 terpolymer of ethylene, methyl methacrylate and glycidyl methacrylate, 3.0 parts of Durastrength®400 core-shell acrylic based impact modifier, 0.2 parts of phenolic antioxidant, 6.0 parts of Nanocyl 7000 multi-walled carbon nanotubes (9.5 nanometer diameter, 1.5 micron length, and an aspect ratio of ~100), 3.0 parts of cyclic polybutylene terephthalate, 2.0 parts of high density polyethylene, and 5 parts of Fusabond® MN-493D polyethylene-polyoctene copolymer grafted with maleic anhydride. This mixing procedure resulted in the production of a PETG/carbon nanotube premix.

In a subsequent mixing step the extruder was charged with an additional 47 parts of Skygreen PETG, an additional 4.0 parts of Lotader 8900 terpolymer of ethylene, methyl methacrylate and glycidyl methacrylate, an additional 3.0 parts of Durastrength®400 core-shell acrylic based impact modifier, 38 parts of the PETG/carbon nanotube premix, 1.0 parts of Glycolube P polyester wax, an additional 8 parts of Fusabond( MN-493D polyethylene-polyoctene copolymer grafted with maleic anhydride, and an additional 1 part of high density polyethylene.

Characterization of the thermoplastic polymer composition made in this experiment show that it had excellent characteristics for being thermoformed into electrically conductive packaging for electronic components, such as disk drive head suspension assembly trays. More specifically, the polymer compound made in this experiment was determined to have the characteristics shown in the Table below:

TABLE 1

| Characteristic | Value |
| --- | --- |
| Surface resistivity | $2.6 \times 10^5$ Ω/sq. |
| Izod impact strength at 23° C. | 2.96 foot-pounds per inch |
| Flexural modulus (stiffness) | 1,215.9 MPa |
| Tensile strength at break | 22 MPa |
| Processability (sheet extrusion and thermoformability); | Excellent |
| Retention of characteristics from (1) to (5) after sheet extrusion and thermoforming | Excellent |

EXAMPLES 2-8

In the following experiments thermoplastic polymer compositions were made utilizing the general procedure described in Example 1. However, the components used and the amounts of these components were varied as shown in Tables 2 and 3. The characteristics of this series of thermoplastic polymer compositions are also depicted in Tables 2 and 3.

Carbon nanotube masterbatch formulations were made in the first mixing step. In the following tables these carbon nanotube masterbatches are designated by an asterisk (*) and includes all of the materials identified above them in the table. Materials which were subsequently added to the carbon nanotube masterbatches are in the rows following the items designated with asterisks in the tables. The materials used in the following Examples are as follows:

| | |
| --- | --- |
| PETG (Skygreen) | Polyethylene terephthalate glycol |
| HDPE 511051 | Polycarbonate with melt flow index of 25 grams per 10 minutes at 190° C. and 2.16 kg |
| C150P, NC7000, 2040 CNT | Multi-walled carbon nanotubes |
| CBT100 | Cyclic polyethylene terephthalate |
| Lotader 8900, Lotader 4700 | Terpolymer of ethylene, methyl methacrylate and glycidyl methacrylate |
| Glycolube P | Polyester wax |
| D440 | Core-shell acrylic based impact modifier |
| PBS 2010 | Polyether sulfone |
| PP/LDPE Blend | Blend of polypropylene with low density polyethylene |
| TOHO A201 | Carbon fiber |
| PBT CX11051 | Medium viscosity polybutylene terephthalate |
| Printex XE2 | High surface area conductive carbon black |
| Fusabond 493D | Polyethylene-polyoctene copolymer grafted with maleic anhydride |
| Fusabond 226DE | Polyethylene graft maleic anhydride |
| AO 1010 | Phenolic antioxidant |
| A0 626 | Phosphate antioxidant |
| AO 412S | Amine antioxidant |
| Surlyn ® 8920 | Ethylene methacrylic acid plastic (EMMA) |
| Entira MK400, Sunova 80HP, Pelestat NC 6321 | Inherently dissipated polymer |
| APET 5005 | Amorphous polyethylene terephthalate |
| Sodium stearate | lubricant |
| Kraton 1901X | Styrene ethylene butadiene styrene grafted with maleic anhydride |
| Pearlthane D11T93 | Thermoplastic polyurethane |
| Ninor | Stabilizer |
| Bruno Bock PETMP | Thiol based crosslinker |
| PC 1225L | High density polyethylene with melt flow index of 10 grams per 10 minutes at 300° C. and 1.2 kg |
| Engage 8180 | Polyolefin plastomer |
| LDPE and LDPE NA520 | Low density polyethylene |
| Bayon YM312, CYRO H15 | Acrylic polymer additive |
| LLDPE (120 FPLDPE) | Linear low density polyethylene |
| CB900 | Medium surface area carbon black |

The thermoplastic polymer compositions made in this series of experiments were prepared utilizing a ZE 25 twin screw extruder (L/D=44). The main feeder of the ZE 25 twin screw extruder was operated at a rate of 400 rpm and with a set temperature profile of 40° C. (feed), 260° C. (Zone 2), 285° C. (Zone 3), 300° C. (Zone 4), 310° C. (Zone 5), 310° C. (Zone 6), 290° C. (Zone 7), 290° C. (Zone 8), and 285° C. (die). The components used in making such thermoplastic polymer compositions and the levels utilized in reported in the following tables.

TABLE 2

| CP 292 (PETG Antistat - HSA Trays) | | |
|---|---|---|
| Material | EXAMPLE 2 | EXAMPLE 3 |
| PETG Skygreen | 42 | 47 |
| Lotader 8900 | 5 | 4 |
| D440 | 5 | 4 |
| CP 290 X1* | 38 | 38 |
| Glycolube P | 1 | 1 |
| Fusabond 493D | 8 | 5 |
| HDPE 511051 | 1 | 1 |
| Properties | | |
| Tensile Modulus (Mpa) | 1036.3 | 1155.5 |
| Tensile Str. @ YLD (Mpa) | 26.4 | 30.2 |
| Tensile Str. @ BRK (Mpa) | 20.5 | 22 |
| Tensile Str. @ BRK (%) | 22.3 | 23.8 |
| Flex Modulus (Mpa) | 1073.8 | 1215.9 |
| Flex Stress (Mpa) | 37.4 | 42.1 |
| Izod Impact @RT (ft-lb/in) | 9.48 PB | 2.96 (3CB) |
| | | 6.76 (2PB) |
| Resistance - Strand (Ohms/sq) | 1.80E+04 | 2.60E+04 |
| Resistance - Tensile (Ohms/sq) | 8.30E+09 | 3.66E+09 |

TABLE 3

| CP 300 (PETG Antistat - HSA Trays) | | | | | | |
|---|---|---|---|---|---|---|
| Material | EXAMPLE 4 | EXAMPLE 5 | EXAMPLE 6 | EXAMPLE 7 | EXAMPLE 8 | EXAMPLE 9 |
| PETG Skygreen | 79.8 | 30 | 37 | 25 | 35 | 79.8 |
| Lotader 8900 | 3 | 5 | 5 | 5 | 5 | 3 |
| D440 | 3 | 5 | 5 | 5 | 5 | 3 |
| AO 1010 | 0.2 | | | | | 0.2 |
| CP 300 X6* | | | | | 45 | |
| C150P | | | | | | 6 |
| CP 300 X1* | | 50 | 43 | 55 | | |
| NC 7000 | 6 | | | | | |
| CBT 100 | 1 | | | | | 1 |
| HDPE 511051 | 2 | 1 | 1 | 1 | 1 | 2 |
| Fusabond 493D | 5 | 8 | 8 | 8 | 8 | 5 |
| Glycolube P | | 1 | 1 | 1 | 1 | |
| Properties | | | | | | |
| Tensile Modulus (Mpa) | 1660.3 | 1085 | 1093.2 | 1100.6 | 1186.8 | |
| Tensile Str. @ YLD (Mpa) | 39.2 | 27.1 | 27.3 | 26.3 | 30.2 | |
| Tensile Str. @ BRK (Mpa) | 27.5 | 25.3 | 27.6 | 21.8 | 28.7 | |
| Tensile Str. @ BRK (%) | 13.3 | 130 | 156.5 | 69.6 | 113 | |
| Flex Modulus (Mpa) | 1916.2 | 1274.5 | 1229.4 | 1226.9 | 1214.9 | |
| Flex Stress (Mpa) | 59 | 40.9 | 40.1 | 39.6 | 38.4 | |
| Izod Impact @RT (ft-lb/in) | 1.89 CB | 15.9 NB | 15.4 NB | 12.2 NB | 17.6 NB | |
| HDT @66 psi (° C.) | 66.1 | 63.9 | 66 | 64.2 | 68.4 | |
| Resistance - Strand (Ohms/sq) | 7.37E+03 | 7.03E+11 | 2.09E+11 | 8.27E+05 | 1.6E+04 | |
| Resistance - Tensile (Ohms/sq) | 4.82E+09 | 6.74E+12 | 7.6E+12 | 5.52E+12 | | |

COMPARATIVE EXAMPLES 10-139

In this series of experiments thermoplastic polymer compositions were again made utilizing the general procedure described in Example 1. The components used and the amounts of these components were varied as shown in Table 4-40. The characteristics of this series of thermoplastic polymer compositions are also depicted in Tables 4-40. As can be seen, the properties of the polymer compositions made in this series of experiments were not optimal for utilization in manufacturing head suspension trays for one or more reasons.

TABLE 4

| | CP 197 (PETG Antistat) | | |
|---|---|---|---|
| Material | EXAMPLE 10 | EXAMPLE 11 | EXAMPLE 12 |
| PETG Skygreen | 75 | 70 | 71 |
| Lotader 8900 | | | 2 |
| Surlyn 8920 | | | 2 |
| Entira MK 400 | 25 | 30 | 25 |
| Properties | | | |
| Tensile Modulus (Mpa) | 1247 | 1146 | 1059 |
| Tensile Str. @ YLD (Mpa) | 21 | 28.3 | 28 |
| Tensile Str. @ BRK (Mpa) | 24 | 28.3 | 28 |
| Tensile Str. @ BRK (%) | 2.3 | 3.1 | 3.4 |
| Flex Modulus (Mpa) | 1332 | 1154 | 1036 |
| Flex Stress (Mpa) | 50 | 46.3 | 41.5 |
| Izod Impact @RT (ft-lb/in) | 0.26 CB | 0.43 CB | 0.45 CB |
| Resistance (ohms/sq) | 3.04E+12 | 3.04E+12 | 2.44E+12 |

TABLE 5

| | CP 198 (PETG Antistat) | | | |
|---|---|---|---|---|
| Material | EXAMPLE 13 | EXAMPLE 14 | EXAMPLE 15 | EXAMPLE 16 |
| APET 5005 | | 75 | 71 | 69 |
| PETG Skygreen | 69 | | | |
| Lotader 8900 | 2 | | 2 | 2 |
| D440 | 2 | | | 2 |
| Surlyn 8920 | 2 | | 2 | 2 |
| Entira MK 400 | 25 | 25 | 25 | 25 |
| Properties | | | | |
| Resistance - Strand (ohms/sq) | 1.62E+13 | 2.64E+12 | 5.08E+12 | 1.90E+12 |

TABLE 6

| | CP 199 (PETG & APET Antistat) | | | | | |
|---|---|---|---|---|---|---|
| Material | EXAMPLE 17 | EXAMPLE 18 | EXAMPLE 19 | EXAMPLE 20 | EXAMPLE 21 | EXAMPLE 22 |
| APET 5005 | | | | 75 | 71 | 69 |
| PETG Skygreen | 75 | 71 | 69 | | | |
| Lotader 8900 | | 2 | 2 | | 2 | 2 |
| D440 | | | 2 | | | 2 |
| Surlyn 8920 | | 2 | 2 | | 2 | 2 |
| Sunova 80HP | 25 | 25 | 25 | 25 | 25 | 25 |
| Properties | | | | | | |
| Resistance - Strand (ohms/sq) | 1.02E+12 | 1.21E+12 | 4.47E+12 | 1.90E+12 | 1.21E+12 | 2.52E+12 |

TABLE 7

| | CP 202 (PETG & APET Antistat) | | | | | |
|---|---|---|---|---|---|---|
| Material | EXAMPLE 23 | EXAMPLE 24 | EXAMPLE 25 | EXAMPLE 26 | EXAMPLE 27 | EXAMPLE 28 |
| PETG Skygreen | 69.5 | 65.5 | 63 | 63 | 64.5 | 64.5 |
| Lotader 8900 | | 2 | 3.5 | | | |
| Surlyn 8920 | | 2 | 3 | 3 | | 5 |
| Na Stearate | 0.5 | 0.5 | 0.5 | 0.5 | 0.5 | 0.5 |
| Sunova 80HP | 30 | 30 | 30 | 30 | 30 | 30 |
| Kraton 1901X | | | | | 3.5 | 5 |

No Properties

TABLE 8

| | CP 203 (PETG Antistat) | | | | |
|---|---|---|---|---|---|
| Material | EXAMPLE 29 | EXAMPLE 30 | EXAMPLE 31 | EXAMPLE 32 | EXAMPLE 33 |
| PETG Skygreen | 65.5 | 65.5 | 65.5 | 65 | 65 |
| Lotader 8900 | 2 | 2 | 2 | | |
| Surlyn 8920 | 2 | 2 | 2 | 5 | 5 |
| Na Stearate | 0.5 | 0.5 | 0.5 | | |
| Pelestat NC 6321 | 30 | | | | |
| Sunova 80HP | | 30 | 30 | 30 | 30 |

No Properties

TABLE 9

| CP 204 (PETG Antistat) | |
|---|---|
| Material | EXAMPLE 34 |
| PETG Skygreen | 70.8 |
| Lotader 8900 | 2 |
| D440 | 2 |
| Pearlthane D11T93 | 25 |
| AO 1010 | 0.2 |

No Properties

TABLE 10

CP 205 (PETG Antistat)

| Material | EXAMPLE 35 | EXAMPLE 36 | EXAMPLE 37 | EXAMPLE 38 | EXAMPLE 39 | EXAMPLE 40 |
|---|---|---|---|---|---|---|
| Lotader 8900 | | 1 | 2 | | 1 | 2 |
| Surlyn 8920 | | 1 | 2 | | 1 | 2 |
| Sunova 80HP | 25 | 25 | 25 | 30 | 30 | 30 |
| CP 204 X1* | 75 | 73 | 71 | 70 | 68 | 66 |

No Properties

TABLE 11

CP 206 (PETG Antistat)

| Material | EXAMPLE 41 | EXAMPLE 42 | EXAMPLE 43 |
|---|---|---|---|
| PETG Skygreen | 10 | 20 | 30 |
| Lotader 8900 | 1 | 1 | 1 |
| Surlyn 8920 | 1 | 1 | 1 |
| Sunova 80HP | 30 | 30 | 30 |
| CP 201 X1* | 58 | 48 | 38 |

No Properties

TABLE 12

CP 207P (PETG Antistat)

| Material | EXAMPLE 44 |
|---|---|
| PETG Skygreen | 20 |
| Lotader 8900 | 1 |
| Surlyn 8920 | 1 |
| Sunova 80HP | 30 |
| CP 201 X1* | 48 |
| Properties | |
| Izod Impact @RT (ft-lb/in) | 16.0 NB |
| Resistance - Disk (ohms/sq) | 3.07E+10 |

TABLE 13

CP 208 (APET Antistat)

| Material | EXAMPLE 45 |
|---|---|
| APET 5005 | 70.8 |
| Lotader 8900 | 2 |
| D440 | 2 |
| Pearlthane D11T93 | 25 |
| AO 1010 | 0.2 |

No Properties

TABLE 14

CP 209 (APET Antistat)

| Material | EXAMPLE 46 | EXAMPLE 47 |
|---|---|---|
| APET 5005 | 20 | |
| Lotader 8900 | 1 | 1 |
| Surlyn 8920 | 1 | 1 |
| Sunova 80HP | 30 | 30 |
| CP 204 X1* | | 20 |
| CP 208 X1* | 48 | 48 |

No Properties

TABLE 15

CP 210P (APET Antistat)

| Material | EXAMPLE 48 |
|---|---|
| APET 5005 | 70.8 |
| Lotader 8900 | 2 |
| D440 | 2 |
| Pearlthane D11T93 | 25 |
| AO 1010 | 0.1 |
| AO 626 | 0.1 |

No Properties

TABLE 16

CP 211P (APET Antistat)

| Material | EXAMPLE 49 |
|---|---|
| Lotader 8900 | 1 |
| Surlyn 8920 | 1 |
| Sunova 80HP | 30 |
| AO 412S | 0.1 |
| Ninor | 0.1 |
| CP 204 X1* | 20 |
| CP 210 X1* | 47.8 |
| Properties | |
| Tensile Modulus (Mpa) | 394 |
| Tensile Str. @ YLD (Mpa) | 11.3 |
| Tensile Str. @ BRK (Mpa) | 11 |
| Tensile Str. @ BRK (%) | 11.2 |
| Flex Modulus (Mpa) | 452 |
| Flex Stress (Mpa) | 18.4 |
| Izod Impact @RT (ft-lb/in) | 0.39 HB |
| HDT @66 psi (° C.) | 50.9 |
| Resistance - Bars (Ohms/sq) | 1.14E+10 |

TABLE 17

CP 213P (APET CNT)

| Material | EXAMPLE 50 |
|---|---|
| APET 5005 | 95.8 |
| Lotader 8900 | 1 |
| NC 7000 | 3 |
| AO 412S | 0.1 |
| Ninor | 0.1 |
| Properties | |
| Tensile Modulus (Mpa) | 2623 |
| Tensile Str. @ YLD (Mpa) | 52.9 |
| Tensile Str. @ BRK (Mpa) | 52.9 |
| Tensile Str. @ BRK (%) | 2.7 |
| Flex Modulus (Mpa) | 2888 |
| Flex Stress (Mpa) | 101 |
| Izod Impact @RT (ft-lb/in) | 0.28 |
| Specific Gravity | 1.383 |

TABLE 18

CP 214 (PETG & PC CNT)

| Material | EXAMPLE 51 | EXAMPLE 52 | EXAMPLE 53 |
|---|---|---|---|
| PETG Skygreen | 95 | | |
| PC 1225L | | 95.5 | 93 |
| Lotader 8900 | 1 | 1 | 1 |
| NC 7000 | 4 | 3.5 | 6 |
| Properties | | | |

TABLE 18-continued

CP 214 (PETG & PC CNT)

| Material | EXAMPLE 51 | EXAMPLE 52 | EXAMPLE 53 |
|---|---|---|---|
| Tensile Modulus (Mpa) | 1841 | | |
| Tensile Str. @ YLD (Mpa) | 50.8 | | |
| Tensile Str. @ BRK (Mpa) | 30 | | |
| Tensile Str. @ BRK (%) | 17.6 | | |
| Flex Modulus (Mpa) | 2326 | | |
| Flex Stress (Mpa) | 75.5 | | |
| Izod Impact @RT (ft-lb/in) | 1.07 | | |
| Specific Gravity | 1.2823 | | |

TABLE 19

CP 228 (APET Antistat)

| Material | EXAMPLE 54 | EXAMPLE 55 | EXAMPLE 56 | EXAMPLE 57 |
|---|---|---|---|---|
| APET 5005 | 95.9 | 95.9 | 93.8 | 93.9 |
| Lotader 8900 | 2 | 2 | 2 | 2 |
| D440 | 2 | | 2 | 2 |
| Surlyn 8920 | | 2 | 2 | 2 |
| Bruno Bock PETMP | | | | 0.1 |
| AO 412S | 0.1 | 0.1 | 0.1 | 0.1 |
| Properties | | | | |
| Tensile Modulus (Mpa) | 1992.4 | 2157.4 | 2031.8 | 2101.1 |
| Tensile Str. @ YLD (Mpa) | 49 | 59.2 | 60 | 60.4 |
| Tensile Str. @ BRK (Mpa) | 49.4 | 58.9 | 38 | 42.2 |
| Tensile Str. @ BRK (%) | 3.3 | 4.3 | 20.6 | 13.8 |
| Flex Modulus (Mpa) | 2147.5 | 2433.3 | 2201.1 | 2361.7 |
| Flex Stress (Mpa) | 81.9 | 94.1 | 88 | 87.8 |
| Izod Impact @RT (ft-lb/in) | 0.85 CB | 0.76 CB | 0.77 CB | 0.64 CB |

TABLE 20

CP 229 (APET Antistat)

| Material | EXAMPLE 58 | EXAMPLE 59 | EXAMPLE 60 |
|---|---|---|---|
| APET 5005 | 89.9 | 86.9 | 79.9 |
| Lotader 8900 | 5 | 5 | 5 |
| D440 | 5 | 8 | 5 |
| Pearlthane D11T93 | | | 10 |
| AO 412S | 0.1 | 0.1 | 0.1 |
| Properties | | | |
| Tensile Modulus (Mpa) | 1580.2 | 1633.7 | 1575.6 |
| Tensile Str. @ YLD (Mpa) | 41.9 | 47.6 | 40.6 |
| Tensile Str. @ BRK (Mpa) | 28 | 30 | |
| Tensile Str. @ BRK (%) | 175 | 21.9 | 19.4 |
| Flex Modulus (Mpa) | 1879.2 | 1681.4 | 1587.5 |
| Flex Stress (Mpa) | 60 | 61.9 | 57.6 |
| Izod Impact @RT (ft-lb/in) | 3.36 CB | 2.99 CB | 1.91 CB |

TABLE 21

CP 230P (APET Antistat Base)

| Material | EXAMPLE 61 |
|---|---|
| APET 5005 | 87.9 |
| Lotader 8900 | 7 |
| D440 | 5 |
| AO 412S | 0.1 |

No Properties

TABLE 22

CP 231P (APET CNT)

| Material | EXAMPLE 62 | EXAMPLE 63 | EXAMPLE 64 |
|---|---|---|---|
| Lotader 8900 | 2.5 | 2.5 | 2.5 |
| CP 230P* | 94.9 | 94.9 | 94.5 |
| C150P | 2.6 | 3 | 3.42 |
| CBT 100 | | | 1.84 |
| HDPE 511051 | | | 0.92 |
| Glycolube P | | | 0.92 |

No Properties

TABLE 23

CP 232P (APET CNT)

| Material | EXAMPLE 65 |
|---|---|
| Lotader 8900 | 2.5 |
| CP 230P* | 90 |
| 2040 CNT | 3.6 |
| CBT 100 | 2 |
| HDPE 511051 | 1 |
| Glycolube P | 0.9 |
| Properties | |
| Tensile Modulus (Mpa) | 1636.4 |
| Tensile Str. @ YLD (Mpa) | 41 |
| Tensile Str. @ BRK (Mpa) | 41.1 |
| Tensile Str. @ BRK (%) | 4.2 |
| Flex Modulus (Mpa) | 1874.2 |
| Flex Stress (Mpa) | 67.9 |
| Izod Impact @RT (ft-lb/in) | 0.69 CB |
| Specific Gravity | 1.2988 |

TABLE 24

CP 237 (APET Antistat Base)

| Material | EXAMPLE 66 | EXAMPLE 67 | EXAMPLE 68 | EXAMPLE 69 | EXAMPLE 70 | EXAMPLE 71 |
|---|---|---|---|---|---|---|
| APET 5005 | 87.9 | 78.9 | 78.9 | | 57.9 | 77.9 |
| Lotader 8900 | 7 | 6 | 5 | 5 | 5 | 5 |
| D440 | 5 | 15 | 5 | 20 | 7 | 7 |
| AO 412S | 0.1 | 0.1 | 0.1 | 0.1 | 0.1 | 0.1 |
| PC 1225L | | | | 75 | | |
| Engage 8180 | | | 11 | | | |
| CP 237 X4* | | | | | 30 | |
| LDPE | | | | | | 10 |
| Properties | | | | | | |
| Tensile Modulus (Mpa) | 1852.3 | | | | | |
| Tensile Str. @ YLD (Mpa) | 52.7 | | | | | |
| Tensile Str. @ BRK (Mpa) | 50.4 | | | | | |
| Tensile Str. @ BRK (%) | 8.3 | | | | | |

TABLE 25

CP 239 (APET Antistat Base)

| Material | EXAMPLE 72 | EXAMPLE 73 | EXAMPLE 74 | EXAMPLE 75 | EXAMPLE 76 |
|---|---|---|---|---|---|
| APET 5005 | | 57.9 | 43.9 | | |
| Lotader 8900 | 5 | 5 | 8 | | |

TABLE 25-continued

CP 239 (APET Antistat Base)

| Material | EXAMPLE 72 | EXAMPLE 73 | EXAMPLE 74 | EXAMPLE 75 | EXAMPLE 76 |
|---|---|---|---|---|---|
| D440 | 20 | 7 | 8 | 2 | 2 |
| AO 412S | | 0.1 | 0.1 | | |
| PC 1225L | 75 | | | | |
| NC 7000 | | | | 5 | 5 |
| CP 239 X1* | | 30 | | | |
| CP 239 X2* | | | 40 | | |
| CP 239 X3* | | | | 93 | |
| | | | | | 93 |

No Properties

TABLE 26

CP 253 (PETG Antistat - HSA Trays)

| Material | EXAMPLE 77 | EXAMPLE 78 | EXAMPLE 79 | EXAMPLE 80 | EXAMPLE 81 |
|---|---|---|---|---|---|
| PETG Skygreen | 70.8 | 19.8 | | | |
| Lotader 8900 | 2 | 1 | | | |
| D440 | 2 | | | | |
| Pearlthane D11T93 | 25 | | | | |
| AO 1010 | 0.2 | | | | |
| Surlyn 8920 | | 1 | | | |
| Sunova 80HP | | 30 | | 30 | 30 |
| CP 253 X1* | | 48 | | 69 | 67 |
| CB 900 | | 0.2 | | | |
| CP 253 X2* | | | 98 | | |
| NC 7000 | | | 2 | 1 | |
| Bayon YM312 | | | | | 3 |

No Properties

TABLE 27

CP 255 (PETG Antistat - HSA Trays)

| Material | EXAMPLE 82 | EXAMPLE 83 | EXAMPLE 84 | EXAMPLE 85 | EXAMPLE 86 |
|---|---|---|---|---|---|
| PETG Skygreen | 69.8 | | | | |
| Lotader 8900 | 2 | 1 | 1 | 1 | 1 |
| D440 | 2 | 3 | | | |
| Pearlthane D11T93 | 25 | | | | |
| AO 1010 | 0.2 | | | | |
| Surlyn 8920 | 1 | | | | |
| Sunova 80HP | | 30 | 30 | 30 | 30 |
| CP 253 X1* | | 66 | 66 | 65 | 65 |
| NC 7000 | | | | 1 | 1 |
| Bayon YM312 | | | | 3 | |
| CYRO H15 | | | 3 | | 3 |

No Properties

TABLE 28

CP 256 (PETG Antistat - HSA Trays)

| Material | EXAMPLE 87 | EXAMPLE 88 | EXAMPLE 89 | EXAMPLE 90 |
|---|---|---|---|---|
| PETG Skygreen | 93 | | | 16.8 |
| Lotader 8900 | 2 | | | 3 |
| D440 | | | | 3 |
| Pearlthane D11T93 | | | | 15 |
| AO 1010 | | | | 0.2 |
| Surlyn 8920 | | | | 2 |
| Sunova 80HP | | | | |
| CP 255 X1* | | 60 | 40 | |
| CP 256 X1* | | 40 | 60 | 60 |
| NC 7000 | 5 | | | |

Properties

| | | | | |
|---|---|---|---|---|
| Tensile Modulus (Mpa) | | 1577.4 | 1835.3 | 1505.7 |
| Tensile Str. @ YLD (Mpa) | | 42.7 | 44.9 | 40.7 |
| Tensile Str. @ BRK (Mpa) | | 33.2 | 44.5 | 40.3 |
| Tensile Str. @ BRK (%) | | 99 | 3.3 | 3.8 |
| Izod Impact @RT (ft-lb/in) | | 1.16 CB | 1.34 CB | 1.68 CB |
| MI @240 C., 5.0 Kg (g/10 min) | | 25.03 | 16.07 | 10.63 |
| Resistance (Ohms/sq) | | 4.07E+12 | 8.39E+09 | 1.65E+09 |

TABLE 29

CP 265 (PETG Antistat - HSA Trays)

| Material | EXAMPLE 91 | EXAMPLE 92 | EXAMPLE 93 | EXAMPLE 94 | EXAMPLE 95 | EXAMPLE 96 |
|---|---|---|---|---|---|---|
| PETG Skygreen | 87 | 11.8 | | 16.8 | 13 | |
| Lotader 8900 | 2 | 3 | 2 | 3 | 3 | 3 |
| D440 | 3 | 3 | 2 | 3 | 3 | 3 |
| Pearlthane D11T93 | | 15 | 13.8 | 15 | 15 | |
| AO 1010 | | 0.2 | 0.2 | 0.2 | 0.2 | 0.2 |
| Surlyn 8920 | | 2 | 2 | 2 | 2 | 2 |
| CP 255 X1* | | | | | | 31.8 |
| CP 265 X1* | | 65 | 80 | 60 | 60 | 60 |
| CBT 100 | 2 | | | | 3.8 | |
| C150P | 6 | | | | | |

Properties

| | | | | | | |
|---|---|---|---|---|---|---|
| Tensile Modulus (Mpa) | | 1549.8 | 1714.8 | 1464.5 | | |
| Resistance - Strand (Ohms/sq) | | 3.6E+06 | 1.5E+03 | 2.9E+03 | | Mid-HighE+03 |

TABLE 30

| CP 266 (PETG Antistat - HSA Trays) | |
|---|---|
| Material | EXAMPLE 97 |
| PETG Skygreen | 11.8 |
| Lotader 8900 | 3 |
| D440 | 3 |
| AO 1010 | 0.2 |
| Surlyn 8920 | 2 |
| CP 255 X1* | 20 |
| CP 265 X1* | 60 |

TABLE 30-continued

| CP 266 (PETG Antistat - HSA Trays) | |
|---|---|
| Material | EXAMPLE 97 |
| Properties | |
| Tensile Modulus (Mpa) | 1744.5 |
| Tensile Str. @ YLD (Mpa) | 41.6 |
| Tensile Str. @ BRK (Mpa) | 35.7 |
| Tensile Str. @ BRK (%) | 7.8 |
| Flex Modulus (Mpa) | 1800.8 |
| Flex Stress (Mpa) | 60.3 |

TABLE 31

| | CP 269 (PETG Antistat - HSA Trays) | | | | | |
|---|---|---|---|---|---|---|
| Material | EXAMPLE 98 | EXAMPLE 99 | EXAMPLE 100 | EXAMPLE 101 | EXAMPLE 102 | EXAMPLE 103 |
| PETG Skygreen | 87 | 11.8 | 11.8 | | 72 | 52.5 |
| Lotader 8900 | 2 | 3 | 3 | | 3 | 3 |
| D440 | 3 | | | | | |
| CBT 100 | 2 | | | | 3.8 | |
| AO 1010 | | 0.2 | 0.2 | | 0.2 | 0.2 |
| Surlyn 8920 | | 2 | 2 | | | |
| LDPE NA520 | | | 15 | 85 | | |
| PP 6310 | | 15 | | | | |
| CP 269 X1* | | 65 | 65 | | | |
| CP 269 X4* | | | | | 15 | 40 |
| C150P | 6 | | | 10 | 3 | 1.25 |
| Lotader 4700 | | 3 | | | | |
| Fusabond 226DE | | | 3 | 5 | 3 | 3 |
| Properties | | | | | | |
| Tensile Modulus (Mpa) | | 1340.5 | 1047.5 | | 1210.8 | 849.4 |
| Tensile Str. @ YLD (Mpa) | | 30.6 | 25 | | 32 | 24.2 |
| Tensile Str. @ BRK (Mpa) | | 27.3 | 21.2 | | 23.1 | 23.8 |
| Tensile Str. @ BRK (%) | | 6.11 | 7.4 | | 39.2 | 5.6 |
| Flex Modulus (Mpa) | | 1554.3 | 1197 | | 1360 | 769.9 |
| Flex Stress (Mpa) | | 46.7 | 39.4 | | 47 | 30.4 |
| Izod Impact @RT (ft-lb/in) | | 1.13 CB | 1.14 CB | | 1.07 CB | 0.94 PB |
| MI @240 C, 5.0 Kg (g/10 min) | | 7.3 | 3.6 | | 6.7 | 0 No Flow |
| Resistance - Strand (Ohms/sq) | | 1.6E+04 | 2.0E+04 | 5.3E+08 | 4.40E+12 | |
| Resistance - Probe (Ohms/sq) | | 5.26E+12 | 3.99E+11 | | 2.7E+10 (2) 4.1E+07 (1) | 1.73E+12 |

TABLE 32

CP 270 (PETG Antistat - HSA Trays)

| Material | EXAMPLE 104 | EXAMPLE 105 | EXAMPLE 106 | EXAMPLE 107 |
|---|---|---|---|---|
| PETG Skygreen | 8.8 | 7.8 | 21.8 | 30.3 |
| Lotader 8900 | 3 | 3 | 3 | 3 |
| D440 | 3 | 3 | 3 | 3 |
| AO 1010 | 0.2 | 0.2 | 0.2 | 0.2 |
| Surlyn 8920 | 2 | 2 | 2 | 2 |
| CP 255 X1* | 20 | 20 | 20 | 20 |
| CP 265 X1* | 60 | 60 | 50 | 41.5 |
| HDPE 511051 | 3 | 2 |   |   |
| Glycolube P |   |   | 2 |   |
| Properties | | | | |
| Tensile Modulus (Mpa) | 1507.8 | 1474 | 1509.7 | 1382.1 |
| Tensile Str. @ YLD (Mpa) | 38.2 | 36.4 | 35.9 | 36.6 |
| Tensile Str. @ BRK (Mpa) | 28.3 | 29.9 | 32.8 | 25.9 |
| Tensile Str. @ BRK (%) | 11.7 | 8.9 | 5.9 | 13.1 |
| Flex Modulus (Mpa) | 1850.3 | 1721.2 | 1899.7 | 1624.3 |
| Flex Stress (Mpa) | 60.7 | 57 | 59.3 | 56.1 |
| Izod Impact @RT (ft-lb/in) | 1.06 CB | 0.77 CB | 0.53 CB | 0.86 CB |
| MI @240 C., 5.0 Kg (g/10 min) | 8.3 | 5.3 | 9.8 | 31.5 |
| Resistance - Strand (Ohms/sq) | 4.16E+03 | 2.36E+03 | 4.48E+03 | 8.76E+05 |
| Resistance - Probe (Ohms/sq) | 4.60E+06 | 3.99E+07 | 7.61E+08 | 3.98E+12 |

TABLE 33

CP 273 (PETG Antistat - HSA Trays)

| Material | EXAMPLE 108 |
|---|---|
| PETG Skygreen | 28 |
| Lotader 8900 | 3.8 |
| D440 | 3 |
| AO 1010 | 0.2 |
| CP 255 X1* | 20 |
| CP 265 X1* | 42 |
| HDPE 511051 | 3 |
| Properties | |
| Tensile Modulus (Mpa) | 1551.4 |
| Tensile Str. @ YLD (Mpa) | 37.4 |
| Tensile Str. @ BRK (Mpa) | 37.4 |
| Tensile Str. @ BRK (%) | 3.3 |
| Flex Modulus (Mpa) | 1666 |
| Flex Stress (Mpa) | 55.2 |
| Izod Impact @RT (ft-lb/in) | 1.19 CB |
| Resistance - Strand (Ohms/sq) | 1.51E+06 |

TABLE 34

CP 288 (PETG Antistat - HSA Trays)

| Material | EXAMPLE 109 | EXAMPLE 110 | EXAMPLE 111 | EXAMPLE 112 | EXAMPLE 113 |
|---|---|---|---|---|---|
| PETG Skygreen | 77.8 | 32 | 32 | 33 | 42 |
| Lotader 8900 | 3 | 4 |   | 5 | 5 |
| D440 | 3 | 4 |   | 2 | 5 |
| AO 1010 | 0.2 |   |   |   |   |
| Pearlthane 11T93 |   |   |   | 15 |   |
| CP 255 X1* |   | 20 | 20 |   |   |
| CP 288 X1* |   | 38 | 38 | 38 | 38 |
| NC 7000 | 6 |   |   |   |   |
| CBT 100 | 3 |   |   |   |   |
| HDPE 511051 | 2 | 1 | 1 | 1 | 1 |
| Fusabond 493D | 5 |   | 8 | 5 | 8 |
| Glycolube P |   | 1 |   | 1 | 1 |
| Properties | | | | | |
| Tensile Modulus (Mpa) |   | 1444.6 | 1350 | 1135.3 | 996.9 |
| Tensile Str. @ YLD (Mpa) |   | 37.8 | 34.9 | 29.6 | 26.9 |
| Tensile Str. @ BRK (Mpa) |   | 23.3 | 22.5 | 20.6 | 21.3 |
| Tensile Str. @ BRK (%) |   | 13 | 11.1 | 21.2 | 31.3 |
| Flex Modulus (Mpa) |   | 1531.1 | 1425.5 | 1202.9 | 1032.8 |
| Flex Stress (Mpa) |   | 55.3 | 50.4 | 41.8 | 37 |
| Izod Impact @RT (ft-lb/in) |   | 3.41 CB | 2.57 CB | 4.43 CB | 25.3 NB |
| Resistance - Strand (Ohms/sq) |   | 7.43E+05 | 1.23E+05 | 5.17E+04 | 4.17E+04 |
| Resistance - Tensile (Ohms/sq) |   | 4.72E+12 | 1.82E+11 | 1.57E+12 | 5.68E+12 |

TABLE 35

CP 290 (PETG Antistat - HSA Trays)

| Material | EXAMPLE 114 | EXAMPLE 115 | EXAMPLE 116 | EXAMPLE 117 | EXAMPLE 118 |
|---|---|---|---|---|---|
| PETG Skygreen | 77.8 | 47 | 42 | 52 | 52 |
| Lotader 8900 | 3 | 4 | 5 | 3 | |
| D440 | 3 | 4 | 5 | | |
| AO 1010 | 0.2 | | | | |
| CP 290 X1* | | 38 | 38 | 38 | 38 |
| NC 7000 | 6 | | | | |
| CBT 100 | 3 | | | | |
| HDPE 511051 | 2 | 1 | 1 | 1 | 1 |
| Fusabond 493D | 5 | 5 | 8 | 5 | 8 |
| Glycolube P | | 1 | 1 | 1 | 1 |
| Properties | | | | | |
| Tensile Modulus (Mpa) | | 1171.9 | 1015.2 | 1233.8 | 1279.7 |
| Tensile Str. @ YLD (Mpa) | | 31.3 | 27.5 | 34.8 | 36.9 |
| Tensile Str. @ BRK (Mpa) | | 23 | 21.8 | 23.9 | 24.4 |
| Tensile Str. @ BRK (%) | | 20.8 | 26.7 | 16.8 | 13.3 |
| Flex Modulus (Mpa) | | 1175 | 1050.7 | 1305.5 | 1386.7 |
| Flex Stress (Mpa) | | 42.1 | 37.5 | 47.3 | 50.1 |
| Izod Impact @RT (ft-lb/in) | | 3.23 CB | 8.55 PB | 2.05 CB | 1.99 CB |
| Resistance - Strand (Ohms/sq) | | 1.57E+04 | 1.77E+04 | 1.40E+04 | 4.57E+04 |
| Resistance - Tensile (Ohms/sq) | | 5.85E+11 | 9.70E+10 | 7.62E+10 | 2.88E+11 |

TABLE 36

CP 291 (PETG Antistat - HSA Trays)

| Material | EXAMPLE 119 | EXAMPLE 120 |
|---|---|---|
| PETG Skygreen | 74.1 | 76.4 |
| Lotader 8900 | 4 | 4 |
| D440 | 6 | 6 |
| NC 7000 | 2.3 | |
| CBT 100 | 1.1 | 1.1 |
| HDPE 511051 | 1.5 | 1.5 |
| Fusabond 493D | 10 | 10 |
| Glycolube P | 1 | 1 |
| Properties | | |
| Tensile Modulus (Mpa) | 1085.1 | 1069.9 |
| Tensile Str. @ YLD (Mpa) | 28.1 | 28.4 |
| Tensile Str. @ BRK (Mpa) | 20.4 | 30.1 |
| Tensile Str. @ BRK (%) | 19.6 | 304.1 |
| Flex Modulus (Mpa) | 1162.8 | 1114.7 |
| Flex Stress (Mpa) | 40.3 | 38.7 |
| Izod Impact @RT (ft-lb/in) | 6.91 NB | 19.2 NB |
| Resistance - Tensile (Ohms/sq) | 1.02E+03 | 6.42E+12 |

TABLE 37

CP 294 (PETG Antistat - HSA Trays)

| Material | EXAMPLE 121 | EXAMPLE 122 | EXAMPLE 123 | EXAMPLE 124 | EXAMPLE 125 | EXAMPLE 126 |
|---|---|---|---|---|---|---|
| PETG Skygreen | 84.1 | 78.1 | 74.1 | 80.1 | 74.1 | 67.1 |
| Lotader 8900 | 4 | | 4 | 4 | 4 | 5 |
| D440 | 6 | 6 | 6 | 10 | 10 | 2 |
| NC 7000 | 2.3 | 2.3 | 2.3 | 2.3 | 2.3 | 2.3 |
| CBT 100 | 1.1 | 1.1 | 1.1 | 1.1 | 1.1 | 1.1 |
| HDPE 511051 | 1.5 | 1.5 | 1.5 | 1.5 | 1.5 | 1.5 |
| Fusabond 493D | | 10 | 10 | | 6 | 5 |
| Glycolube P | 1 | 1 | 1 | 1 | 1 | 1 |
| Pearlthane 11T93 | | | | | | 15 |
| Properties | | | | | | |
| Tensile Modulus (Mpa) | 1403.7 | 1369.4 | 1103.9 | 1277.4 | 1116.2 | 1117.3 |

TABLE 37-continued

CP 294 (PETG Antistat - HSA Trays)

| Material | EXAMPLE 121 | EXAMPLE 122 | EXAMPLE 123 | EXAMPLE 124 | EXAMPLE 125 | EXAMPLE 126 |
|---|---|---|---|---|---|---|
| Tensile Str. @ YLD (Mpa) | 39.2 | 35.7 | 28.8 | 34.5 | 29.6 | 30.2 |
| Tensile Str. @ BRK (Mpa) | 25.3 | 23.8 | 20.6 | 23.8 | 21.1 | 20.2 |
| Tensile Str. @ BRK (%) | 14.1 | 10.6 | 22.2 | 18.3 | 16.4 | 19 |
| Flex Modulus (Mpa) | 1587.3 | 1569.4 | 1205.5 | 1541.7 | 1208 | 1291.8 |
| Flex Stress (Mpa) | 54.2 | 49.2 | 42 | 52.9 | 42.8 | 44.9 |
| Izod Impact @RT (ft-lb/in) | 1.27 CB | 1.56 CB | 2.98 CB | 1.73 CB | 2.63 CB | 2.40 CB |
| Resistance - Strand (Ohms/sq) | 9.63E+04 | 1.02E+04 | 7.37E+05 | 1.43E+04 | 5.30E+05 | 1.11E+12 |
| Resistance - Tensile (Ohms/sq) | 7.82E+09 | 1.40E+06 | 4.98E+12 | 3.94E+08 | 7.08E+12 | 1.04E+13 |

TABLE 38

CP 296 (PETG Antistat - HSA Trays)

| Material | EXAMPLE 127 | EXAMPLE 128 | EXAMPLE 129 | EXAMPLE 130 |
|---|---|---|---|---|
| PETG Skygreen | 77.8 | 50 | 47 | 47 |
| Lotader 8900 | 3 | 5 | | 5 |
| D440 | 3 | 5 | 5 | |
| AO 1010 | 0.2 | | | |
| CP 290 X1* | | 38 | 38 | 38 |
| NC 7000 | 6 | | | |
| CBT 100 | 3 | | | |
| HDPE 511051 | 2 | 1 | 1 | 1 |
| Fusabond 493D | 5 | | 8 | 8 |
| Glycolube P | | 1 | 1 | 1 |

No Properties

TABLE 39

CP 297 (PETG Antistat - HSA Breaker Plate)

| Material | EXAMPLE 131 | EXAMPLE 132 | EXAMPLE 133 | EXAMPLE 134 |
|---|---|---|---|---|
| PETG Skygreen | 77.8 | 42 | 42 | 30 |
| Lotader 8900 | 3 | 5 | 5 | 5 |
| D440 | 3 | 5 | 5 | 5 |
| AO 1010 | 0.2 | | | |
| LLDPE (120FPLDPE) | | | 2 | |
| CP 297 X1* | | 38 | 38 | 50 |
| NC 7000 | 6 | | | |
| CBT 100 | 3 | | | |
| HDPE 511051 | 2 | 1 | 1 | 1 |
| Fusabond 493D | 5 | 8 | 8 | 8 |
| Glycolube P | | 1 | | 1 |

Properties

| | | | | |
|---|---|---|---|---|
| Tensile Modulus (Mpa) | | 1015 | | 948 |
| Tensile Str. @ YLD (Mpa) | | 26 | | 23.7 |
| Tensile Str. @ BRK (Mpa) | | 19.4 | | 18.4 |
| Tensile Str. @ BRK (%) | | 34.6 | | 37.9 |
| Flex Modulus (Mpa) | | 1064 | | 986 |
| Flex Stress (Mpa) | | 37 | | 33 |
| HDT @66 psi (° C.) | | 63.7 | | 61.4 |
| Specific Gravity | | 1.1805 | | 1.1665 |
| Resistance - Strand (Ohms/sq) | | | 2.43E+12 | 2.37E+12 |

TABLE 40

CP 299 (PETG Antistat - HSA Trays)

| Material | EXAMPLE 135 | EXAMPLE 136 | EXAMPLE 137 | EXAMPLE 138 | EXAMPLE 139 |
|---|---|---|---|---|---|
| PETG Skygreen | 85.7 | 83 | 83 | 78.8 | 79.9 |
| Lotader 8900 | 4.2 | | 4.2 | 4.2 | 4.2 |
| D440 | 4.2 | 4.2 | | 4.2 | 4.2 |
| C150P | 2.3 | 2.3 | 2.3 | 2.3 | 2.3 |
| CBT 100 | 1.1 | 1.1 | 1.1 | 1.1 | |
| HDPE 511051 | 1.5 | 1.5 | 1.5 | 1.5 | 1.5 |
| Fusabond 493D | | 6.9 | 6.9 | 6.9 | 6.9 |
| Glycolube P | 1 | 1 | 1 | 1 | 1 |

TABLE 40-continued

CP 299 (PETG Antistat - HSA Trays)

| Material | EXAMPLE 135 | EXAMPLE 136 | EXAMPLE 137 | EXAMPLE 138 | EXAMPLE 139 |
|---|---|---|---|---|---|
| Properties | | | | | |
| Tensile Modulus (Mpa) | 1464 | 1383 | 1309.7 | 1211.3 | 1207.1 |
| Tensile Str. @ YLD (Mpa) | 39.6 | 36 | 34.8 | 32.4 | 31.9 |
| Tensile Str. @ BRK (Mpa) | 23.2 | 21.9 | 21.7 | 21.2 | 22.1 |
| Tensile Str. @ BRK (%) | 20.1 | 17.4 | 57.1 | 35.7 | 65.2 |
| Flex Modulus (Mpa) | 1645 | 1480 | 1375 | 1285 | 1269 |
| Flex Stress (Mpa) | 56 | 51 | 49 | 46 | 45 |
| HDT @66 psi (° C.) | 65.3 | 65.8 | 68.3 | 65.7 | 68.1 |
| Specific Gravity | 1.2423 | 1.221 | 1.2178 | 1.2095 | 1.2105 |

While certain representative embodiments and details have been shown for the purpose of illustrating the subject invention, it will be apparent to those skilled in this art that various changes and modifications can be made therein without departing from the scope of the subject invention.

What is claimed is:

1. A thermoplastic polymer composition which is comprised of (1) a polyethylene terephthalate glycol copolyester, (2) from 1 weight percent to 6 weight percent carbon nanotubes, (3) from 2 weight percent to 30 weight percent of a copolymer of ethylene with a higher α-olefin, wherein the copolymer is of ethylene with the higher α-olefin is grafted with maleic anhydride or glycidyl methacrylate, (4) from 1 weight percent to 10 weight percent of a functionalized rubbery polymer, (5) from 1 weight percent to 10 weight percent of an acrylic based core-shell polymer, and (6) from 0.5 weight percent to 6 weight percent of a lubricant selected from the group consisting of high density polyethylene and polyester wax, where the polyethylene terephthalate glycol copolyester makes up the balance of the composition and wherein all weight percentages are based upon the total weight of the thermoplastic polymer composition.

2. A thermoplastic polymer composition as specified in claim 1 wherein the polyethylene terephthalate glycol copolyester is comprised of repeat units that are derived from terephthalic acid, ethylene glycol, and at least one additional glycol selected from the group consisting of 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, and 1,3-cyclohexanedimethanol.

3. A thermoplastic polymer composition as specified in claim 2 wherein the additional glycol is 1,4-cyclohexanedimethanol.

4. A thermoplastic polymer composition as specified in claim 3 wherein the 1,4-cyclohexanedimethanol constitutes from about 10 mole percent to about 40 mole percent of the glycol component.

5. A thermoplastic polymer composition as specified in claim 1 wherein the polyethylene terephthalate glycol copolyester has a melt viscosity which is within the range of 0.8 to 10 grams per 10 minutes.

6. A thermoplastic polymer composition as specified in claim 1 wherein the polyethylene terephthalate glycol copolyester has a melt viscosity which is within the range of 0.9 to 5 grams per 10 minutes.

7. A thermoplastic polymer composition as specified in claim 1 wherein the carbon nanotubes have a diameter which is within the range of 5 nanometers to 20 nanometers and a length which is within the range of 1 micron to 5 microns.

8. A thermoplastic polymer composition as specified in claim 1 wherein the carbon nanotubes have a diameter which is within the range of 7 nanometers to 15 nanometers and a length which is within the range of 1 micron to 3 microns.

9. A thermoplastic polymer composition as specified in claim 1 wherein the carbon nanotubes have an aspect ratio which is within the range of 80 to 180.

10. A thermoplastic polymer composition as specified in claim 8 wherein the carbon nanotubes have an aspect ratio which is within the range of 95 to 120.

11. A thermoplastic polymer composition as specified in claim 1 wherein the functionalized rubbery polymer is a terpolymer of ethylene, methyl methacrylate, and glycidyl methacrylate.

12. A thermoplastic polymer composition as specified in claim 1 wherein the carbon nanotubes are present at a level which is within the range of 1.5 weight percent to 5 weight percent.

13. A thermoplastic polymer composition as specified in claim 2 wherein the copolymer of ethylene with a higher α-olefin is present at a level which is within the range of 4 weight percent to 25 weight.

14. A thermoplastic polymer composition as specified in claim 13 wherein the functionalized rubbery polymer is present at a level which is within the range of 2 weight percent to 8 weight percent.

15. A thermoplastic polymer composition as specified in claim 14 wherein the acrylic core-shell polymer is present at a level which is within the range of 2 weight percent to 8 weight percent, and wherein the lubricant is present at a level which is within the range of 0.8 weight percent to 4 weight percent.

16. A thermoplastic polymer composition as specified in claim 1 wherein the carbon nanotubes are present at a level which is within the range of 2 weight percent to 4 weight percent, wherein the copolymer of ethylene with a higher α-olefin is present at a level which is within the range of 6 weight percent to 15 weight, wherein the functionalized rubbery polymer is present at a level which is within the range of 3 weight percent to 6 weight percent, wherein the acrylic core-shell polymer is present at a level which is within the range of 3 weight percent to 6 weight percent, and wherein the lubricant is present at a level which is within the range of 1 weight percent to 3 weight percent.

17. A thermoplastic polymer composition as specified in claim 1 wherein the lubricant is a high density polyethylene.

18. A thermoplastic polymer composition as specified in claim 1 wherein the lubricant is a polyester wax.

19. A disk drive head suspension assembly tray which is comprised of an exterior frame having substantially perpendicularly adjacent sides, frame sides having essentially planar top and bottom surfaces, at least two feet, at least two foot seats, at least one support rib, and a repository that is adapted to seat and retain a disk drive head suspension, wherein the disk drive head suspension assembly tray is comprised of (1) a polyethylene terephthalate glycol copolyester, (2) from 1 weight percent to 6 weight percent carbon nanotubes, (3) from 2 weight percent to 30 weight percent of a copolymer of ethylene with a higher α-olefin, wherein the copolymer is of ethylene with the higher α-olefin is grafted with maleic anhydride or glycidyl methacrylate, (4) from 1 weight percent to 10 weight percent of a functionalized rubbery polymer, (5) from 1 weight percent to 10 weight percent of an acrylic based core-shell polymer, and (6) from 0.5 weight percent to 6 weight percent of a lubricant selected from the group consisting of high density polyethylene and polyester wax, where the polyethylene terephthalate glycol copolyester makes up the balance of the composition and wherein all weight percentages are based upon the total weight of the thermoplastic polymer composition.

20. A process for making a thermoplastic polymer composition which comprises (1) mixing a polyethylene terephthalate glycol copolymer and carbon nanotubes in a first mixing step to produce a PETG/carbon nanotube premix, and (2) mixing additional polyethylene terephthalate glycol copolymer, a copolymer of ethylene with a higher α-olefin, wherein the copolymer is of ethylene with the higher α-olefin is grafted with maleic anhydride or glycidyl methacrylate, a functionalized rubbery polymer, an acrylic based core-shell polymer, and a lubricant selected from the group consisting of high density polyethylene and polyester wax throughout the PETG/carbon nanotube premix made in step (1), wherein from 25 weight percent to 70 weight percent of the total constituents of the thermoplastic polymer composition are added in step (1) to make the premix.

\* \* \* \* \*